United States Patent
Sung et al.

(10) Patent No.: US 10,178,685 B2
(45) Date of Patent: Jan. 8, 2019

(54) SCHEDULING METHOD AND APPARATUS IN MOBILE COMMUNICATION SYSTEM

(71) Applicants: ELECTRONICS AND TELECOMMUNICATIONS RESEARCH INSTITUTE, Daejeon (KR); KOREA ADVANCED INSTITUTE OF SCIENCE AND TECHNOLOGY, Daejeon (KR)

(72) Inventors: Youngchul Sung, Daejeon (KR); Gilwon Lee, Daejeon (KR); Juho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 62 days.

(21) Appl. No.: 15/381,968

(22) Filed: Dec. 16, 2016

(65) Prior Publication Data

US 2017/0181183 A1 Jun. 22, 2017

(30) Foreign Application Priority Data

Dec. 18, 2015 (KR) .................. 10-2015-0182245
Dec. 16, 2016 (KR) .................. 10-2016-0172529

(51) Int. Cl.
*H04W 72/12* (2009.01)
*H04W 16/28* (2009.01)

(52) U.S. Cl.
CPC ....... *H04W 72/1231* (2013.01); *H04W 16/28* (2013.01)

(58) Field of Classification Search
CPC ................. H04W 72/1231; H04W 16/28
(Continued)

(56) References Cited

U.S. PATENT DOCUMENTS 9,237,475 B2 1/2016 Josiam et al.
2011/0096738 A1 4/2011 Choi
(Continued)

FOREIGN PATENT DOCUMENTS

KR 10-2013-0103449 A 9/2013
KR 10-2014-0045752 A 4/2014
KR 10-2015-0097939 A 8/2015

OTHER PUBLICATIONS

Jose Lopez Vicario et al., "Beam Selection Strategies for Orthogonal Random Beamforming in Sparse Networks", IEEE Transactions on Wireless Communications, vol. 7, No. 9, Sep. 2008.
(Continued)

*Primary Examiner* — Obaidul Huq
(74) *Attorney, Agent, or Firm* — Rabin & Berdo, P.C.

(57) ABSTRACT

A base station using a plurality of beams transmits a plurality of training beams, receives measurement information regarding a first number of training beams with a highest received signal strength indication (RSSI) from each of a plurality of terminals which have received the plurality of training beams, generates an RSSI table representing RSSIs of terminals and beam indices on the basis of the measurement information regarding the first number of training beams of each terminal, and subsequently schedules terminals to perform simultaneous transmission among the plurality of terminals using the RSSI table.

11 Claims, 9 Drawing Sheets

(58) Field of Classification Search
USPC .......................................... 370/310, 328, 329
See application file for complete search history.

(56) References Cited

U.S. PATENT DOCUMENTS

| | | | |
|---|---|---|---|
| 2011/0211490 A1* | 9/2011 | Nikula .................. | H04B 7/086 370/252 |
| 2014/0098695 A1 | 4/2014 | Jeong et al. | |
| 2015/0103934 A1 | 4/2015 | Nam et al. | |
| 2015/0181609 A1* | 6/2015 | Nusairat ................ | H04L 5/006 370/329 |

OTHER PUBLICATIONS

Gilwon Lee et al., "On the Performance of Random Beamforming in Sparse Millimeter Wave Channels", IEEE Journal of Selected Topics in Signal Processing, vol. 10, No. 3, Apr. 2016.

* cited by examiner

SCHEDULING METHOD AND APPARATUS IN MOBILE COMMUNICATION SYSTEM

CROSS-REFERENCE TO RELATED APPLICATION

This application claims priority to and the benefit of Korean Patent Application Nos. 10-2015-0182245, and 10-2016-0172529 filed in the Korean Intellectual Property Office on Dec. 18, 2015, and Dec. 16, 2016, the entire contents of which are incorporated herein by reference.

BACKGROUND OF THE INVENTION

(a) Field of the Invention

The present invention relates to a scheduling method and apparatus in a mobile communication system, and more particularly, to a scheduling method and apparatus in a mobile communication system capable of easily and simply performing feedback of a terminal and scheduling in a base station in a mobile communication system using a directional beam.

(b) Description of the Related Art

With the advent of mobile broadband services, mobile communication systems are expected to meet various demands of a plurality of users. In particular, in a sound-oriented data environment in which it is important to guarantee a predetermined minimum data rate, as demand for wireless transmission of various multimedia such as music, video, web surfing, and the like, is rapidly increasing, active scheduling (resource allocation) depending on an amount and a type of information currently requested by terminals is considered to be greatly important.

A $5^{th}$-generation mobile communication system is required to support a data rate up to 20 Gbps for terminals and maintain a data rate of about 100 Mbps to 1 Gbps no matter where a terminal is placed in a cell. In addition, the $5^{th}$-generation mobile communication system is required to support latency within 1 ms, simultaneous connection of massive devices, and the like. In order to achieve such technological objectives, recently, adoption of a millimeter wave band to a mobile communication system has come to prominence. The millimeter wave band is advantageous in that it easily secures a large bandwidth for high speed data transmission and lower latency in a physical layer but disadvantageous in that propagation is severely attenuated according to a transmission/reception distance and blockage occurs due to a building, geographical features, and the like.

Thus, the mobile communication system using a millimeter wave band uses a directional beam in a transmitter/receiver in order to compensate for severe attenuation of a channel. Here, in order to maximize performance of the system, a base station should support data simultaneously for several terminals using multiple beams. That is, it is required to realize a multi-user multiple-input multiple-output (MU-MIMO) system. However, interference occurs between beams in operating multiple beams to degrading performance of the system, leading to the necessity to perform scheduling in consideration of inter-beam interference.

In addition, a feedback structure of an existing long-term evolution (LTE)/LTE-advanced (LTE-A) is designed on the basis of a scheme in which users use different resources, making it difficult to realize a highly efficient MU-MIMO system. Thus, in order to obtain maximum system performance in the mobile communication system using a directional beam, a novel CSI feedback structure and scheduling scheme are required.

SUMMARY OF THE INVENTION

The present invention has been made in an effort to provide a scheduling method and apparatus having advantages of enhancing system performance in a mobile communication system using a directional beam.

An exemplary embodiment of the present invention provides a method for scheduling a plurality of terminals within a cell by a base station (BS) using a plurality of beams. The method may include: transmitting a plurality of training beams; receiving measurement information regarding a first number of training beams with a highest received signal strength indication (RSSI) from each of the plurality of terminals which have received the plurality of training beams; generating an RSSI table representing RSSIs of terminals and beam indices on the basis of measurement information regarding the first number of training beams of each terminal; and scheduling terminals to which data is to be transmitted among the plurality of terminals using the RSSI table.

The measurement information may include an RSSI, a reception phase, and a beam index regarding each of the first number of training beam.

The scheduling may include: selecting a terminal whose sum of squares of RSSIs of a first number of training beams is largest from among terminals of a scheduling-available terminal set; excluding the selected terminal from the terminal set and excluding the first number of training beams of the selected terminal from a beam index set including the plurality of beams; excluding a terminal whose number of beams, among a first number of training beams, overlapping the first number of training beams of the selected terminal, is greater than a set maximum allowable number, among the terminals of the terminal set, from the terminal set; and scheduling terminals to perform simultaneous transmission by repeating the selecting, the generating, and the excluding operations.

The scheduling may further include: generating a transmission beam to the selected terminal using the RSSI of the first number of training beams of the selected terminal.

The method may further include: defining a beam set obtained by unionizing the first number of training beams of each of the scheduled terminals; allocating a value 0 to RSSIs and reception phases of beams whose feedback has not been received from each of the scheduled terminals, among beams of the unionized beam set; and designing minimum mean square error (MMSE) or zero-forcing (ZF) beamforming or any beamforming using the RSSIs and the reception phases of all the beams of each of the scheduled terminals.

The measurement information may include a reception phase and a beam index regarding each of the first number of training beams and the sum of RSSIs of the first number of training beams.

The scheduling may include: selecting a terminal whose sum of RSSIs of the first number of training beams is largest, from the scheduling-available terminal set; generating a transmission beam to be transmitted to the selected terminal using reception phases of the first number of training beams of the selected terminal; excluding the selected terminal from the terminal set and excluding the first number of training beams of the selected terminal from a beam index set including the plurality of beams; excluding a terminal whose number of beams, among a first number of training beams, overlapping the first number of training beams of the selected terminal, is greater than a set maximum allowable number, among the terminals of the terminal set, from the terminal set; and scheduling terminals to perform simultaneous transmission by repeating the selecting, the generating, and the excluding operations.

The method may further include: transmitting data of corresponding terminals through transmission beams of the scheduled terminals.

The measurement information may include a beam index regarding each of the first number of training beams and the sum of RSSIs of the first number of training beams.

The scheduling may include: selecting a terminal whose sum of RSSIs of the first number of training beams is largest, from the scheduling-available terminal set; excluding the selected terminal from the terminal set and excluding the first number of training beams of the selected terminal from a beam index set including the plurality of beams; excluding a terminal whose number of beams, among a first number of training beams, overlapping the first number of training beams of the selected terminal, is greater than a set maximum allowable number, among the terminals of the terminal set, from the terminal set; and scheduling terminals to perform simultaneous transmission by repeating the selecting, the generating, and the excluding operations.

The method may further include: defining a beam set obtained by unionizing the first number of training beams of each of the scheduled terminals; requesting feedback from each of the scheduled terminals and receiving RSSIs and reception phases of beams of the unionized beam set from each of the terminals; and designing MMSE or ZF beamforming or any beamforming using the RSSIs and the reception phases of the beams of each of the scheduled terminals.

Another exemplary embodiment of the present invention provides an apparatus for scheduling a plurality of terminals within a cell by a base station (BS) using a plurality of beams. The apparatus may include: a transceiver and a processor. The transceiver may transmit a plurality of training beams and receive measurement information regarding a first number of training beams with a highest received signal strength indication (RSSI) from each of the plurality of terminals which have received the plurality of training beams. The processor may generate an RSSI table representing RSSIs of terminals and beam indices on the basis of measurement information regarding the first number of training beams of each terminal, and schedule the plurality of terminals using the RSSI table according to a beamforming scheme of the BS.

The measurement information may include an RSSI, a reception phase, and a beam index regarding each of the first number of training beam.

The processor may schedule a set number of terminals on the basis of the sum of squares of RSSIs of the first number of training beams of each of terminals of a scheduling-available terminal set, and excludes a terminal whose number of beams, among a first number of training beams, overlapping the first number of training beams of the scheduled terminals, is greater than a set maximum allowable number, among the terminals of the terminal set, from the scheduling.

The processor may generate transmission beams for a maximum ratio transmission (MRT) type beamforming by combining RSSIs regarding the first number of training beams of each of the scheduled terminals.

The processor may allocate a value 0 to RSSIs and reception phases of beams whose feedback has not been received from each of the scheduled terminals, among beams of the beam set obtained by unionizing the first number of training beams of each of the scheduled terminals, and subsequently design minimum mean square error (MMSE) or zero-forcing (ZF) beamforming using the RSSIs and the reception phases of all the beams of each of the scheduled terminals.

The measurement information may include a reception phase and a beam index regarding each of the first number of training beams and the sum of RSSIs of the first number of beams.

The processor may schedule a set number of terminals on the basis of the sum of RSSIs of the first number of training beams of each of terminals of a scheduling-available terminal set, combines reception phases regarding the first number of training beams of each of the scheduled terminals to generate transmission beam for an equal gain combining (EGC) type beamforming, and exclude a terminal whose number of beams, among a first number of training beams, overlapping the first number of training beams of the scheduled terminals, is greater than a set maximum allowable number, among the terminals of the terminal set, from the scheduling.

The measurement information may include a beam index regarding each of the first number of training beams and the sum of RSSIs of the first number of training beams.

The processor may schedule a set number of terminals on the basis of the sum of squares of RSSIs of the first number of training beams of each of terminals of a scheduling-available terminal set, excludes a terminal whose number of beams, among a first number of training beams, overlapping the first number of training beams of the scheduled terminals, is greater than a set maximum allowable number, among the terminals of the terminal set, requests RSSIs and reception phases of beams of a beam set obtained by unionizing the first number of training beams of each of the scheduled terminals from each of the scheduled terminals, receives the requested RSSIs and reception phases from each of the scheduled terminals, and designs minimum mean square error (MMSE) or zero-forcing (ZF) beamforming using the RSSIs and the reception phases of the beams of the unionized beam set received from each of the scheduled terminals.

Figure 1:
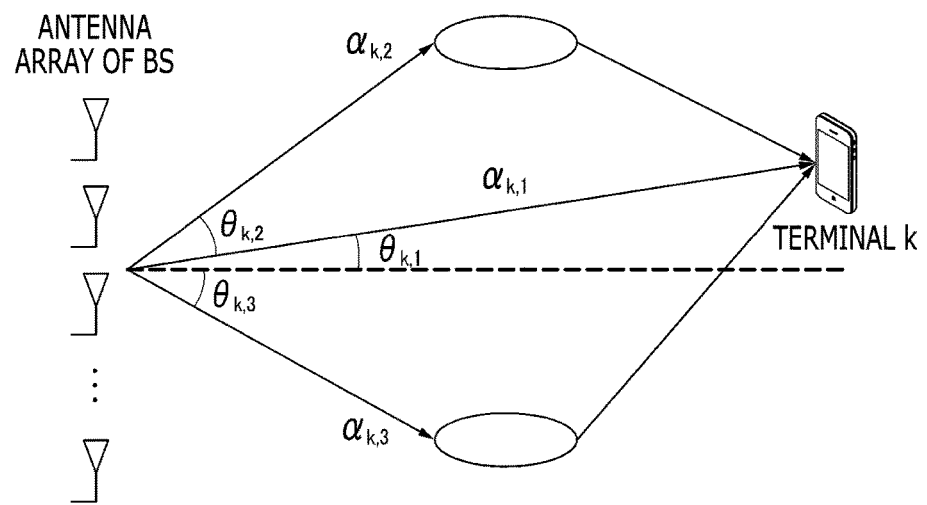
FIG. 1 is a view illustrating an example of a path between a base station and a terminal according to an exemplary embodiment of the present invention.

DETAILED DESCRIPTION OF THE
EXEMPLARY EMBODIMENTS

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Hereinafter, a scheduling method and apparatus in a mobile communication system according to an exemplary embodiment of the present invention will be described in detail with reference to the accompanying drawings.

FIG. 1 is a view illustrating an example of a path between a base station and a terminal according to exemplary embodiment of the present invention.

A millimeter wave band refers to a frequency band ranging from 30 GHz to 300 GHz. A channel of a millimeter wave band has strong straightness, thus having poor diffraction and reflection characteristics based on an object in a path and being greatly attenuated in the air. Thus, a limited number of paths are present between a base station (BS) and a terminal.

For example, as illustrated in FIG. 1, three paths may be present between a BS and a terminal k. A first path, a path corresponding to a line-of-sight (LoS), is present in a position which has rotated by an angle of $\theta_{k,1}$ with respect to a bore-sight that an antenna of the BS is oriented, and has a channel gain of $\alpha_{k,1}$. A second path and a third path, paths reflected from a cluster and incident to the terminal k, are present in positions rotated by angles of $\theta_{k,2}$ and $\theta_{k,3}$, respectively, with respect to the bore-sight that the antenna of the BS is oriented, and have channel gains $\alpha_{k,2}$ and $\alpha_{k,3}$, respectively.

A channel between the BS and the terminal k illustrated in FIG. 1 may be expressed as Equation 1.

$$h_k = \sqrt{\frac{M}{L}} \sum_{i=1}^{L} \alpha_{k,i} a(\theta_{k,i}) \quad \text{(Equation 1)}$$

Here, L is the number of paths between the BS and the terminal k, M is the number of antennas installed in the BS, $\alpha_{k,i}$ is a complex channel gain corresponding to a path i of the terminal k, and $a(\theta_{k,i})$ may be expressed as Equation 2.

$$a(\theta_{k,i}) = \frac{1}{\sqrt{M}} [1, e^{-\iota\pi\theta}, \ldots, e^{-\iota\pi(M-1)\theta}]^T \quad \text{(Equation 2)}$$

Equation 2 expresses a response of an antenna array between an antenna array of the BS and an angle $\theta_{k,i}$. Equation 2 expresses a phase difference according to delay that occurs when a signal reaches the antenna array.

Figure 2:
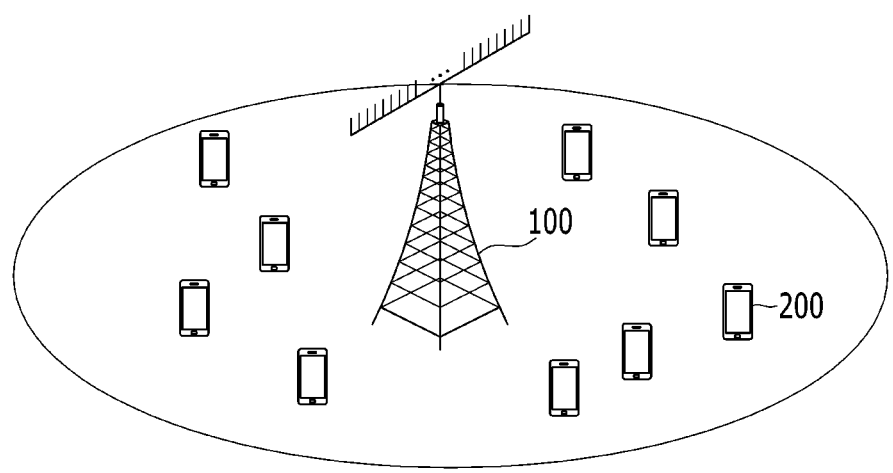
FIG. 2 is a view illustrating a plurality of terminals within an area covered by a base station according to an exemplary embodiment of the present invention.

FIG. 2 is a view illustrating a plurality of terminals within an area covered by a base station according to exemplary embodiment of the present invention.

Referring to FIG. 2, a plurality of terminals 200 may be positioned in a cell area served by a single BS 100. The BS 100 selects (schedules) a terminal 200 to exhibit optimal performance among the plurality of terminals 200 within the cell area.

Figure 3:
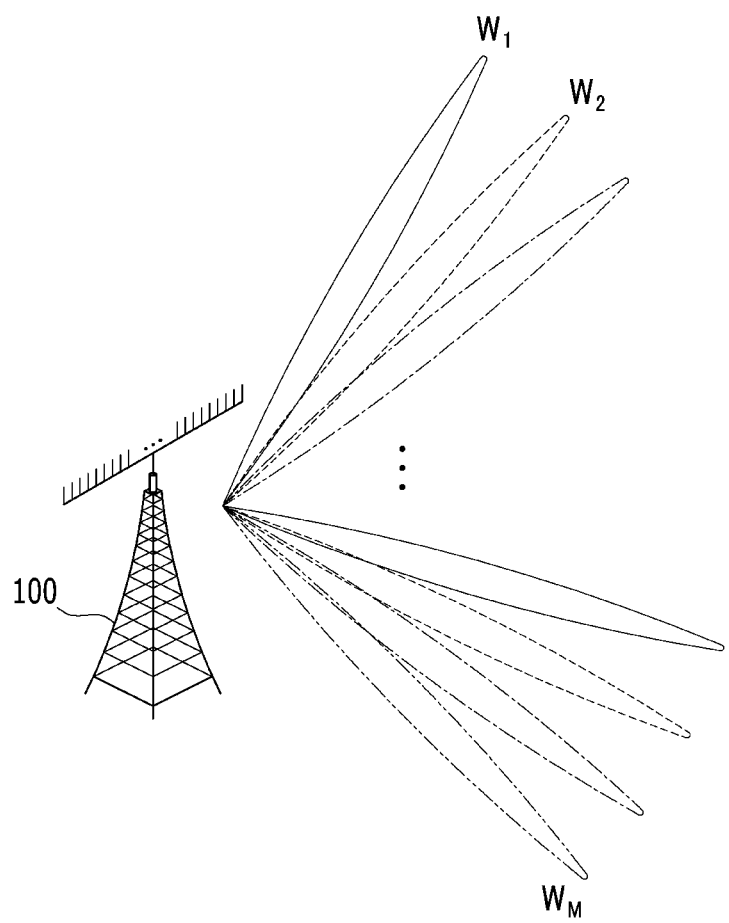
FIG. 3 is a view illustrating beamforming of a base station according to an exemplary embodiment of the present invention.

FIG. 3 is a view illustrating beamforming of a base station according to exemplary embodiment of the present invention.

Referring to FIG. 3, the BS 100 operating in a millimeter wave band fully covers the cell area it serves, and uses a plurality of directional beams to support multiple users.

The simplest method for generating a directional beam is to use an antenna array, and here, in particular, a uniform linear array (ULA) scheme may be used. The ULA is a scheme in which antenna elements are arranged in a linear array structure, while an interval therebetween is uniformly maintained.

When the BS 100 uses M number of antenna elements having the ULA structure, the BS 100 may generate M number of orthogonal training beams ($w_1, w_2, \ldots, w_M$). As the BS 100 generates M number of training beams ($w_1, w_2, \ldots, w_M$) and transmits the generated training beams through a specific resource, the terminal 200 within the cell may measure a channel between the terminal 200 and the BS 100. The terminal 200 may measure a signal-to-noise ratio (SNR) or a received signal strength indication (RSSI) with respect to all the training beams ($w_1, w_2, \ldots, w_M$). However, since the BS 100 transmits data in the same resource using only some of the M number of training beams, when data is actually received, a signal-to-interference and noise ratio (SINR) may not be known.

In a mobile communication system using multiple beams, one of feedback of the terminal 200 and scheduling methods is that the terminals 200 feed back an RSSI (or an SNR) with respect to all of the M number of training beams used by the BS 100 and the BS 100 determines a terminal to be used for actual data transmission using the RSSI (or SNR) corresponding to the M number of training beams transmitted from all the terminals 200 through exhaustive search. Such a scheme may obtain optimal performance given to the system, but an amount of feedback of the terminals 200 and calculation complexity are too high (much) to be applied to an actual system.

Thus, in an exemplary embodiment of the present invention, the terminal 200 feeds back a beam index corresponding to $N_{FB}$ number of training beams having a high RSSI among M number of RSSIs measured through the training beams and RSSIs of the $N_{FB}$ number of training beams to the BS 100. When the terminals 200 within the cell feed back the RSSIs of the $N_{FB}$ number of training beams and the beam index, the BS 100 may generate an RSSI table representing RSSIs corresponding to the terminals 200 and the beam index.

Figure 4:
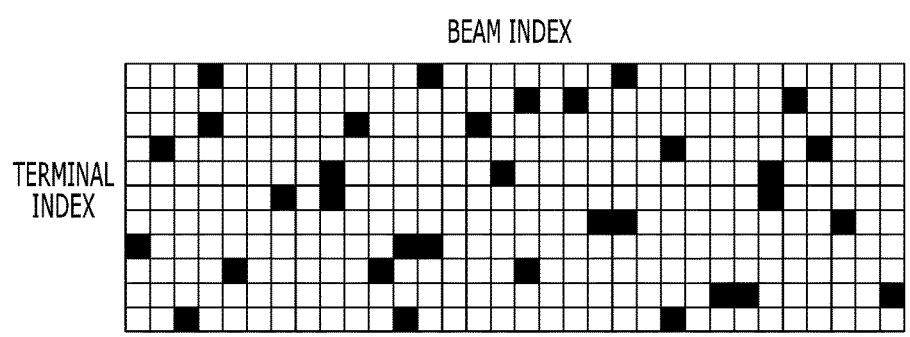
FIG. 4 is a view illustrating an example of a received signal strength indication (RSSI) table generated by a base station according to an exemplary embodiment of the present invention.

FIG. 4 is a view illustrating an example of an RSSI table generated by a base station according to exemplary embodiment of the present invention.

Referring to FIG. 4, in the RSSI table, portions where each terminal has fed back an RSSI are blacked.

When generating the RSSI table, the BS 100 may allocate a corresponding RSSI value to a beam index in which the terminal has fed back an RSSI, among the entire beam indices 1 to M, and may allocate 0 or a specific value to a beam index in which the terminal does not feed back an RSSI. In FIG. 4, for the convenience of sake, portions where each terminal has fed back an RSSI are blacked.

A channel $h_k$ of a millimeter band that may be expressed as Equation 1 includes the sum of L number of paths, and thus, an RSSI of a certain training beam is strong when a direction of one or more paths among the L number of paths toward the terminal and a direction oriented by a certain training beam are well-matched.

When the RSSI table as illustrated in FIG. 4 is generated, the BS 100 may schedule a terminal using the RSSI table. For example, the BS 100 may schedule a terminal using a greedy sequential scheduling algorithm using the RSSI table. Referring to the greedy sequential scheduling algorithm, the BS 100 first selects a terminal and a beam having a highest RSSI from the RSSI table, and selects a terminal and a beam whose sum data rate is a maximum among terminals and beams other than the selected terminal and beam. The BS 100 continuously performs this process until a maximum number of scheduling-available terminals is reached.

The greedy sequential scheduling scheme is a method appropriate when the BS 100 selects one of a plurality of training beams with respect to each terminal and uses the selected beam for data transmission. However, selecting one training beam and transmitting data to a terminal in a channel of a millimeter band in which several paths are present as in Equation 1 is not an optimal method. Thus, a method of coupling a plurality of training beams to generate and use a beam for transmitting data adequately in an estimated channel is required.

An exemplary embodiment of the present invention proposes a feedback scheme of a terminal and a scheduling scheme of a base station when the base station 100 combines a plurality of training beams to generate a beam for transmitting data.

When the feedback scheme of a terminal and a scheduling scheme of a base station proposed in an exemplary embodiment of the present invention are used, a maximum ratio transmission (MRT) and an equal gain combining (EGC) type beamforming may be realized in the BS 100, without increasing an amount of feedback in a channel of a millimeter band. A feedback scheme of a terminal and a scheduling scheme of a base station are slightly different according to a beamforming scheme of the BS, and thus, hereinafter, a feedback scheme of a terminal and a scheduling scheme of a BS appropriate for each beamforming scheme when the BS 100 performs MRT beamforming or EGC beamforming will be described. In addition, a method in which the BS 100 designs minimum mean square error (MMSE) or zero-forcing (ZF) beamforming using feedback information of a terminal, in using terminal feedback scheme of a terminal and a scheduling method of the BS used in MRT beamforming will be described. Also, a two-phase feedback-based terminal feedback and scheduling and beamforming design method of a BS in which the BS 100 selects a terminal and a beam to be used on the basis of a feedback method of a terminal having an amount of feedback smaller than an amount of feedback of a terminal used for MRT or EGC beamforming in a first time interval and designs MMSE or ZF beamforming upon receiving feedback of channel information corresponding to the selected beam from the selected terminal in a second time interval will be described.

First, feedback of a terminal and a scheduling method of a BS appropriate for MRT beamforming when the BS 100 uses MRT beamforming will be described with reference to FIG. 5, and feedback of a terminal and a scheduling method of a BS appropriate for EGC beamforming when the BS 100 uses EGC beamforming will be described with reference to FIG. 6. Also, a method for designing MMSE or ZF beamforming when the BS 100 uses feedback of a terminal and a scheduling method of a BS used in MRT beamforming will be described with reference to FIG. 7, and a two-phase feedback-based terminal feedback and scheduling and beamforming design method of a BS will be described with reference to FIG. 8.

Figure 5:
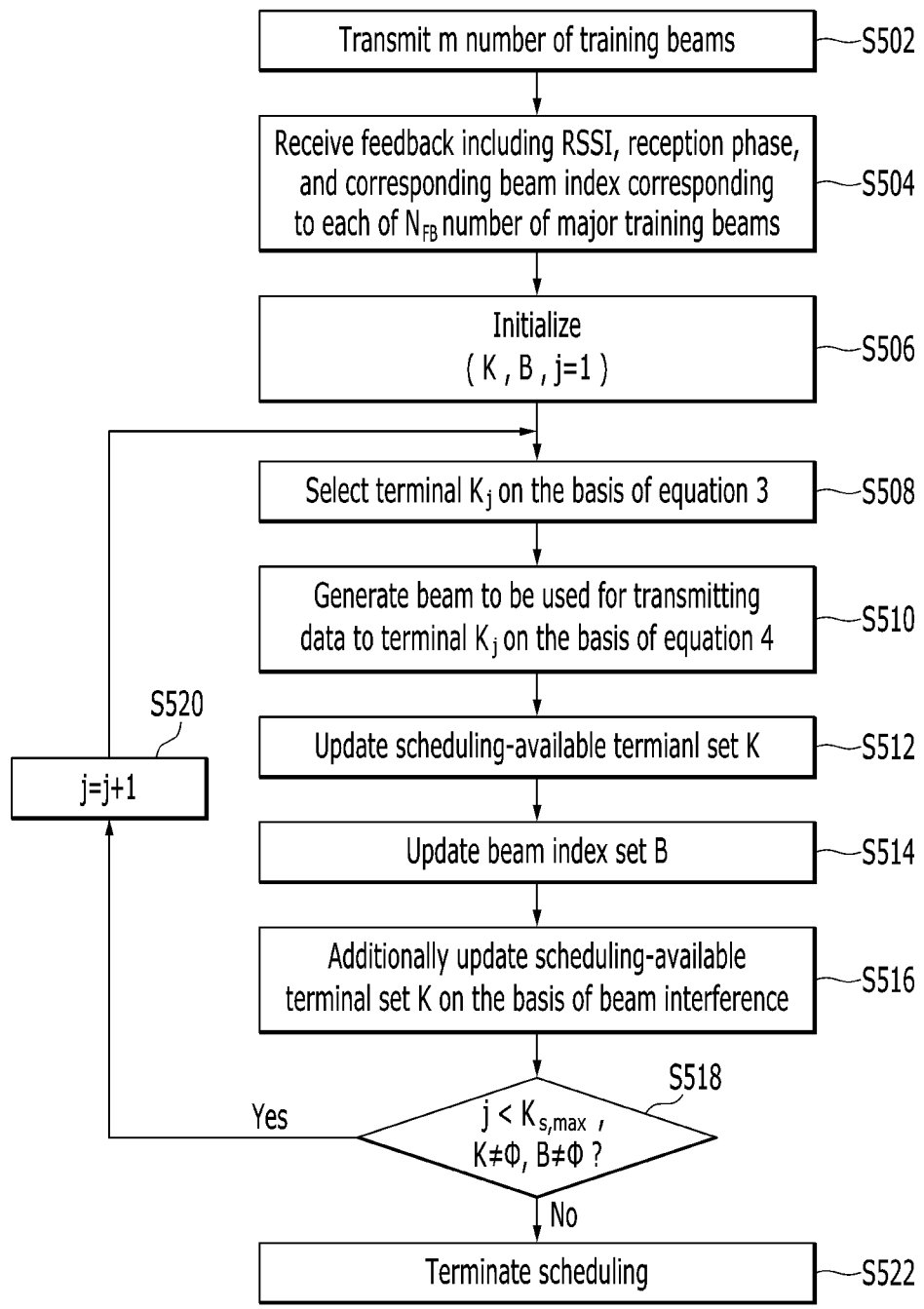
FIGS. 5 to 7 are flow charts illustrating feedback of a terminal and a scheduling method of a base station according to first to third exemplary embodiments of the present invention.

FIG. 5 is a flow chart illustrating feedback of a terminal and a scheduling method of a base station according to a first exemplary embodiment of the present invention.

Referring to FIG. 5, the BS 100 transmits M number of training beams in operation S502.

When a terminal receives the M number of training beams, the terminal may select $N_{FB}$ number of major training beams having high RSSI. The $N_{FB}$ number of training beams may be considered to be well-matched with L number of paths between the BS and the terminal and considered to simulate a channel between the terminal and the BS.

When the BS 100 uses MRT beamforming, the terminal feeds back an RSSI and a reception phase corresponding to each of the $N_{FB}$ number of major training beams, and an index of a corresponding beam. An RSSI, a phase value, and an index of a corresponding beam fed back by the terminal may be expressed as $\{|h_k^H w_b|, b \in \mathcal{B}_k\}$, $\{\angle(h_k^H w_b), b \in \mathcal{B}_k\}$, and $\mathcal{B}_k$, respectively. $|h_k^H w_b|$ indicates an RSSI of a major training beam $w_b$ in a terminal k. $\angle(h_k^H w_b)$ indicates a reception phase of the major training beam $w_b$ in the terminal k. Also, $\mathcal{B}_k$ indicates a beam index set of the $N_{FB}$ number of major training beams with high RSSI selected by the terminal k.

When feedback including the RSSIs and the reception phases respectively corresponding to the $N_{FB}$ number of major training beams, and indices of the corresponding beams is received from each terminal in operation S504, the BS 100 performs scheduling in the following manner.

The BS 100 initializes a scheduling-available terminal set $[\mathcal{K} = \{1, 2, \ldots, K\}]$ and a beam index set $[\mathcal{B} = \{1, 2, \ldots, M\}]$ of the training beams in operation S506. The BS 100 initializes the scheduling-available terminal set $[\mathcal{K} = \{1, 2, \ldots, K\}]$ to include entire scheduling-available terminals and initializes the beam index set $[\mathcal{B} = \{1, 2, \ldots, M\}]$ to include the entire beam indices. The BS 100 initializes j to 1 (j=1)

Here, j indicates the number of iteration of a terminal scheduling algorithm.

The BS 100 selects a terminal with highest RSSI when the major training beams are used among the scheduling-available terminal set using Equation 3 in operation S508. A terminal selected from jth iteration will be referred to as $k_j$.

$$\mathcal{K}_j = \underset{k \in \mathcal{K}}{\arg\max} \sum_{b \in \mathcal{B}_k} |h_k^H w_b|^2 \quad \text{(Equation 3)}$$

Next, the BS 100 generates a beam to be used for transmitting data to the terminal $k_j$ as expressed by Equation 4 in operation S510. That is, when transmitting data to the terminal $k_j$, the BS 100 generates beams to be used for transmission to the terminal $k_j$ by combining $N_{FB}$ number of major training beams regarding the terminal $k_j$. That is, MRT beamforming is performed by combining $N_{FB}$ number of major training beams.

$$\overline{w}_j = \frac{\sum_{b \in \mathcal{B}_{\mathcal{K}_j}} (h_{\mathcal{K}_j}^H w_b) * w_b}{\left\| \sum_{b \in \mathcal{B}_{\mathcal{K}_j}} (h_{\mathcal{K}_j}^H w_b) * w_b \right\|} \quad \text{(Equation 4)}$$

In this manner, when the terminal $k_j$ and the beam $\overline{w}_j$ to be used for transmitting data to the terminal $k_j$ are determined, the BS 100 updates a scheduling-available terminal set as expressed by Equation 5 in operation S512 and updates the beam index set as expressed by Equation 6 in operation S514. That is, the BS 100 excludes the terminal $k_j$ from the scheduling-available terminal set and excludes the beam $\mathcal{B}_{\mathcal{K}_j}$ from the beam index set.

$$\mathcal{K} \leftarrow \mathcal{K} \setminus \{k_j\} \quad \text{(Equation 5)}$$

$$\mathcal{B} = \mathcal{B} \setminus \{\mathcal{B}_{\kappa_j}\} \quad \text{(Equation 6)}$$

After the BS 100 determines the optimal terminal $k_j$ and the beam to be used for transmission to the terminal $k_j$ in this manner, the BS 100 additionally performs the following process to leave only a terminal less interfered by the corresponding beam.

The BS 100 updates the scheduling-available terminal set $\mathcal{K}$ according to Equation 7 such that only a terminal less interfered by the beam to be used for transmission to the terminal $k_j$ is left in the scheduling-available terminal set $\mathcal{K}$ in operation S516.

$$\mathcal{K} = \{k \in \mathcal{K} : |\mathcal{B}_{\kappa_j} \cap \mathcal{B}_k| \leq N_{OL}\} \quad \text{(Equation 7)}$$

Here, $N_{OL}$ is a maximum allowable number of major training beams that overlap between mutually different terminals.

When the scheduling-available terminal set $\mathcal{K}$ is updated with terminals satisfying Equation 7, the BS 100 may leave only a terminal less interfered when simultaneously scheduled with the currently selected terminal, in the scheduling-available terminal set $\mathcal{K}$.

When the BS 100 satisfies all of $j < K_{s,max}$, $\mathcal{K} \neq \emptyset$, $\mathcal{B} \neq \emptyset$ in operation S518, the BS 100 increases to $j=j+1$ in operation S520 and repeatedly performs operations S508 to S518, or otherwise, the BS 100 terminates the scheduling algorithm in operation S522. Here, $K_{s,max}(\leq M)$ is a predetermined constant value (natural number).

When the BS 100 performs MRT beamforming, it can be noted that an amount of feedback of the terminal when such a scheduling scheme is used is $2N_{FB}$ real numbers and $N_{FB}$ integers.

Figure 6:
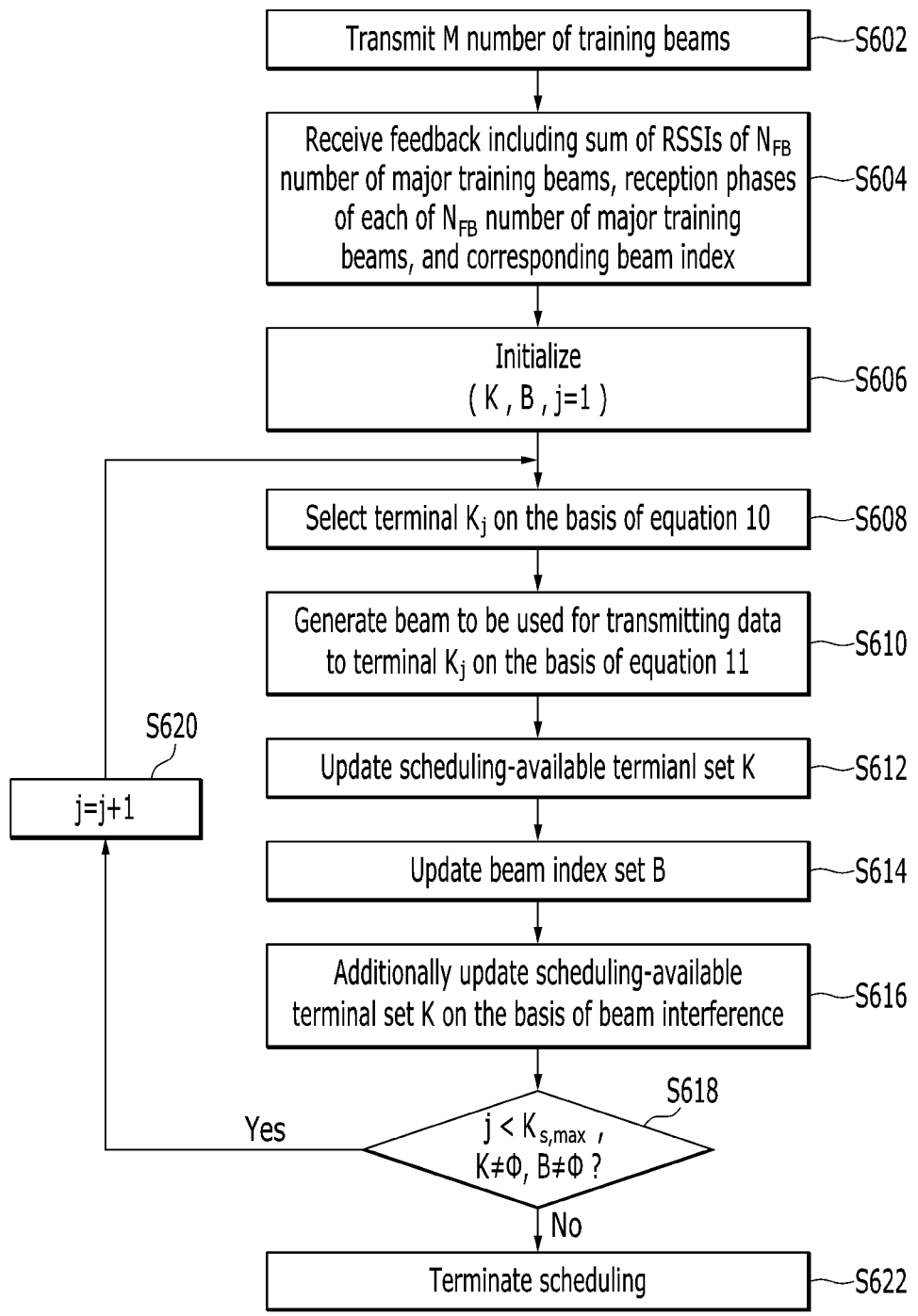

FIG. 6 is a flow chart illustrating feedback of a terminal and a scheduling method of a base station according to a second exemplary embodiment of the present invention.

Referring to FIG. 6, the BS 100 transmits M number of training beams in operation S602.

When a terminal receives the M number of training beams, the terminal may select $N_{FB}$ number of major training beams with high RSSI.

When the BS 100 performs EGC type beamforming, the terminal feeds back information corresponding to Equation 8 and Equation 9 and a beam index set $\mathcal{B}_k$ of $N_{FB}$ number of major training beams with high RSSI to the BS 100.

$$\sum_{b \in \mathcal{B}_k} |h_k^H w_b| \quad \text{(Equation 8)}$$

$$\{\angle(h_k^H w_b), b \in \mathcal{B}_k\} \quad \text{(Equation 9)}$$

In a case where the BS 100 performs EGC type beamforming, the terminal feeds back only information regarding the sum of RSSIs of $N_{FB}$ number of major training beams with high RSSIs, rather than feeding back RSSIs of $N_{FB}$ number of major training beams with high RSSIs, and thus, an amount of feedback of the terminal may be reduced to be smaller than an amount of feedback of the terminal when the BS 100 performs the MRT type beamforming.

When the BS 100 receives the feedback including the sum of RSSIs of the $N_{FB}$ number of major training beams, reception phases of the $N_{FB}$ number of major training beams, and the beam index set $\mathcal{B}_k$ from each terminal in operation S604, the BS 100 performs scheduling in the following manner. Compared with the MRT type beamforming, a method for selecting a terminal and a method for generating a beam for transmitting data to the corresponding terminal are different.

The BS 100 initializes a scheduling-available terminal set $[\mathcal{K} = \{1, 2, \ldots, K\}]$ and a beam index set of training beams $[\mathcal{B} = \{1, 2, \ldots, M\}]$ in operation S606. The BS 100 initializes the scheduling-available terminal set $[\mathcal{K} = \{1, 2, \ldots, K\}]$ to include entire scheduling-available terminals, and initializes the beam index set $[\mathcal{B} = \{1, 2, \ldots, M\}]$ to include the entire beam index. The BS 100 initializes j to 1 (j=1). Here, j indicates the number of iteration of a terminal scheduling algorithm.

The BS 100 selects a terminal with highest RSSI when the major training beams are used among the scheduling-available terminal set using Equation 10 in operation S608. A terminal selected from jth iteration will be referred to as $k_j$.

$$\mathcal{K}_j = \underset{k \in \mathcal{K}}{\mathrm{argmax}} \sum_{b \in \mathcal{B}_k} |h_k^H w_b| \quad \text{(Equation 10)}$$

Next, the BS 100 generates a beam to be used for transmitting data to the terminal $k_j$ as expressed by Equation 11 in operation S610, thus performing EGC beamforming.

$$\overline{w}_j = \frac{\sum_{b \in \mathcal{B}_{\mathcal{K}_j}} e^{-u\left(h_{\mathcal{K}_j}^H w_b\right)} w_b}{\left\| \sum_{b \in \mathcal{B}_{\mathcal{K}_j}} e^{-u\left(h_{\mathcal{K}_j}^H w_b\right)} w_b \right\|} \quad \text{(Equation 11)}$$

In this manner, when the terminal $k_j$ and the beam $\overline{w}_j$ to be used for transmitting data to the terminal $k_j$ are determined, the BS 100 updates a scheduling-available terminal set as expressed by Equation 12 in operation S612 and updates the beam index set as expressed by Equation 13 in operation S614. That is, the BS 100 excludes the terminal $k_j$ from the scheduling-available terminal set and excludes the beam $\mathcal{B}_{\kappa_j}$ from the beam index set.

$$\mathcal{K} \leftarrow \mathcal{K} \setminus \{k_j\} \quad \text{(Equation 12)}$$

$$\mathcal{B} = \mathcal{B} \setminus \{\mathcal{B}_{\kappa_j}\} \quad \text{(Equation 13)}$$

After the BS 100 determines the optimal terminal $k_j$ and the beam to be used for transmission to the terminal $k_j$ in this manner, the BS 100 additionally performs the following process to leave only a terminal less interfered by the corresponding beam.

The BS 100 updates the scheduling-available terminal set $\mathcal{K}$ according to Equation 14 such that only a terminal less interfered by the beam to be used for transmission to the terminal $k_j$ is left in the scheduling-available terminal set $\mathcal{K}$ in operation S616.

$$\mathcal{K} = \{k \in \mathcal{K} : |\mathcal{B}_{\kappa_j} \cap \mathcal{B}_k| \leq N_{OL}\} \quad \text{(Equation 14)}$$

Here, $N_{OL}$ is a maximum allowable number of major training beams that overlap between mutually different terminals.

When the scheduling-available terminal set $\mathcal{K}$ is updated with terminals satisfying Equation 14, the BS 100 may leave only a terminal less interfered when simultaneously scheduled with the currently selected terminal, in the scheduling-available terminal set $\mathcal{K}$.

When the BS 100 satisfies all of j<$K_{s,max}$, $\mathcal{K} \neq \emptyset$, $\mathcal{B} \neq \emptyset$ in operation S618, the BS 100 increases to j=j+1 in operation S620 and repeatedly performs operations S608 to S618, or otherwise, the BS 100 terminates the scheduling algorithm in operation S622. Here, $K_{s,max}(\leq M)$ is a predetermined constant value (natural number).

When the BS 100 uses ECG beamforming, it can be noted that an amount of feedback of the terminal when such a scheduling scheme is used is ($N_{FB}$+1) real numbers and $N_{FB}$ integers, and thus, the amount of feedback of the terminal is reduced, compared with the amount of feedback when the MRT beamforming is used.

Figure 7:
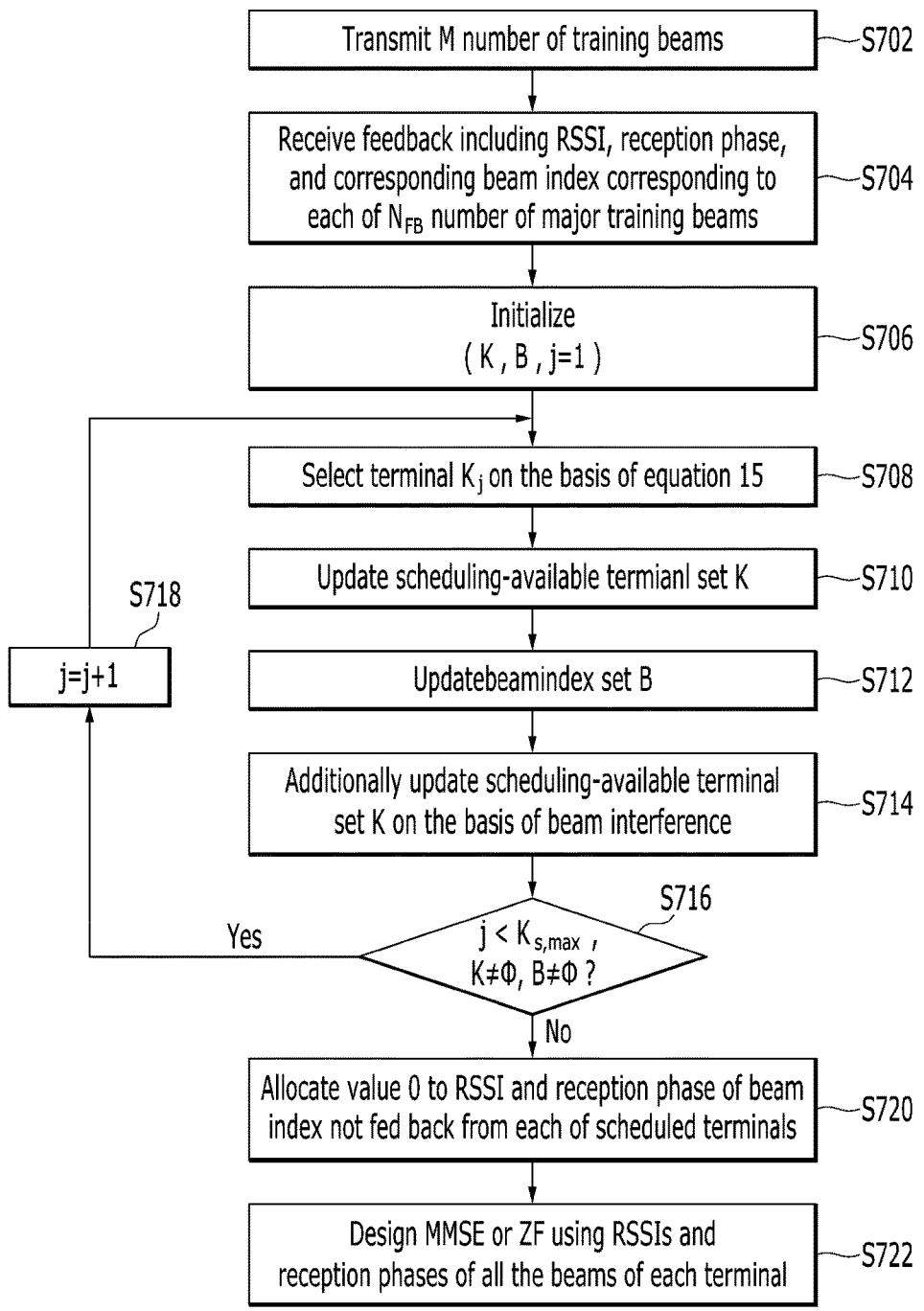

FIG. 7 is a flow chart illustrating feedback of a terminal and a scheduling method of a base station according to a third exemplary embodiment of the present invention.

Referring to FIG. 7, the BS 100 transmits M number of training beams in operation S702.

When the BS 100 receives the feedback including an RSSI corresponding to each of the $N_{FB}$ number of major training beams, a reception phase of each of the $N_{FB}$ number of major training beams, and a corresponding beam index from each terminal in operation S704, the BS 100 performs scheduling in the following manner.

The BS 100 initializes a scheduling-available terminal set [$\mathcal{K}$ ={1, 2, . . . , K}] and a beam index set of training beams [$\mathcal{B}$ ={1, 2, . . . , M}] in operation S706.

The BS 100 selects a terminal with highest RSSI when the major training beams are used among the scheduling-available terminal set using Equation 15 in operation S708. A terminal selected from jth iteration will be referred to as $k_j$.

$$\mathcal{K}_j = \underset{k \in \mathcal{K}}{\text{argmax}} \sum_{b \in \mathcal{B}_k} |h_k^H w_b|^2 \quad \text{(Equation 15)}$$

When the terminal $k_j$ is determined, the BS 100 updates a scheduling-available terminal set as expressed by Equation 16 in operation S710 and updates the beam index set as expressed by Equation 17 in operation S712. That is, the BS 100 excludes the terminal $k_j$ from the scheduling-available terminal set and excludes the beam $\mathcal{B}_{\kappa_j}$ from the beam index set.

$$\mathcal{K} \leftarrow \mathcal{K} \setminus \{k_j\} \quad \text{(Equation 16)}$$

$$\mathcal{B} = \mathcal{B} \setminus \{\mathcal{B}_{\kappa_j}\} \quad \text{(Equation 17)}$$

The BS 100 updates the scheduling-available terminal set $\mathcal{K}$ according to Equation 18 such that only a terminal whose major training beam less overlaps the major training beam of the terminal $k_j$ is left in the scheduling-available terminal set $\mathcal{K}$ in operation S714.

$$\mathcal{K} = \{k \in \mathcal{K} : |\mathcal{B}_{\kappa_j} \cap \mathcal{B}_k| \leq N_{OL}\} \quad \text{(Equation 18)}$$

Here, $N_{OL}$ is a maximum allowable number of major training beams that overlap between mutually different terminals.

When the scheduling-available terminal set $\mathcal{K}$ is updated with terminals satisfying Equation 18, the BS 100 may leave only a terminal whose channel is substantially orthogonal to that of the currently selected terminal when simultaneously scheduled with the currently selected terminal, in the scheduling-available terminal set $\mathcal{K}$.

When the BS 100 satisfies all of j<$K_{s,max}$, $\mathcal{K} \neq \emptyset$, $\mathcal{B} \neq \emptyset$ in operation S716, the BS 100 increases to j=j+1 in operation S718 and repeatedly performs operations S708 to S716, or otherwise, the BS 100 terminates the terminal scheduling algorithm in operation. Here, $K_{s,max}(\leq M)$ is a predetermined constant value (natural number).

In this manner, after scheduling the terminals, the BS 100 may define a beam set B* obtained by unionizing the major training beams of each of the scheduled terminals as expressed by Equation 19.

$$\mathcal{B}^* := \bigcup_{i=1}^{J} \mathcal{B}_{\kappa_i} \quad \text{(Equation 19)}$$

Here, J is a value j when moving from operation S716 to operation S720.

The BS 100 knows only RSSIs and reception phases of beams corresponding to the major training beam set $\mathcal{B}_{\kappa_i}$ of each of the scheduled terminals $k_j$. Thus, since the BS 100 does not know RSSIs and reception phases of beams corresponding to $\mathcal{B}_{\kappa_j} * \setminus \mathcal{B}_{\kappa_j}$ of each of the terminals the BS 100 allocates a value 0 to the RSSIs and the reception phases of the beams corresponding to $\mathcal{B}_{\kappa_j} * \setminus \mathcal{B}_{\kappa_j}$ in operation S720. Then, the BS 100 may be regarded as accurately knowing channel state information (CSI) (i.e., RSSIs and reception phases of every beam of $\mathcal{B}_{\kappa_j} *$ of each terminal) within a subspace spanned by beams corresponding to a beam index present within $\mathcal{B}_{\kappa_j} *$. The BS 100 designs MMSE or ZF beamforming on the basis of the accurate CSI information within the subspace in operation S722. Furthermore, The BS 100 may design any beamforming that is different from the MMSE or ZF beamforming on the basis of the CSI information within the subspace.

It can be noted that an amount of feedback of the terminal when the BS 100 uses such scheduling scheme and beamforming is 2$N_{FB}$ real numbers and $N_{FB}$ integers.

Figure 8:
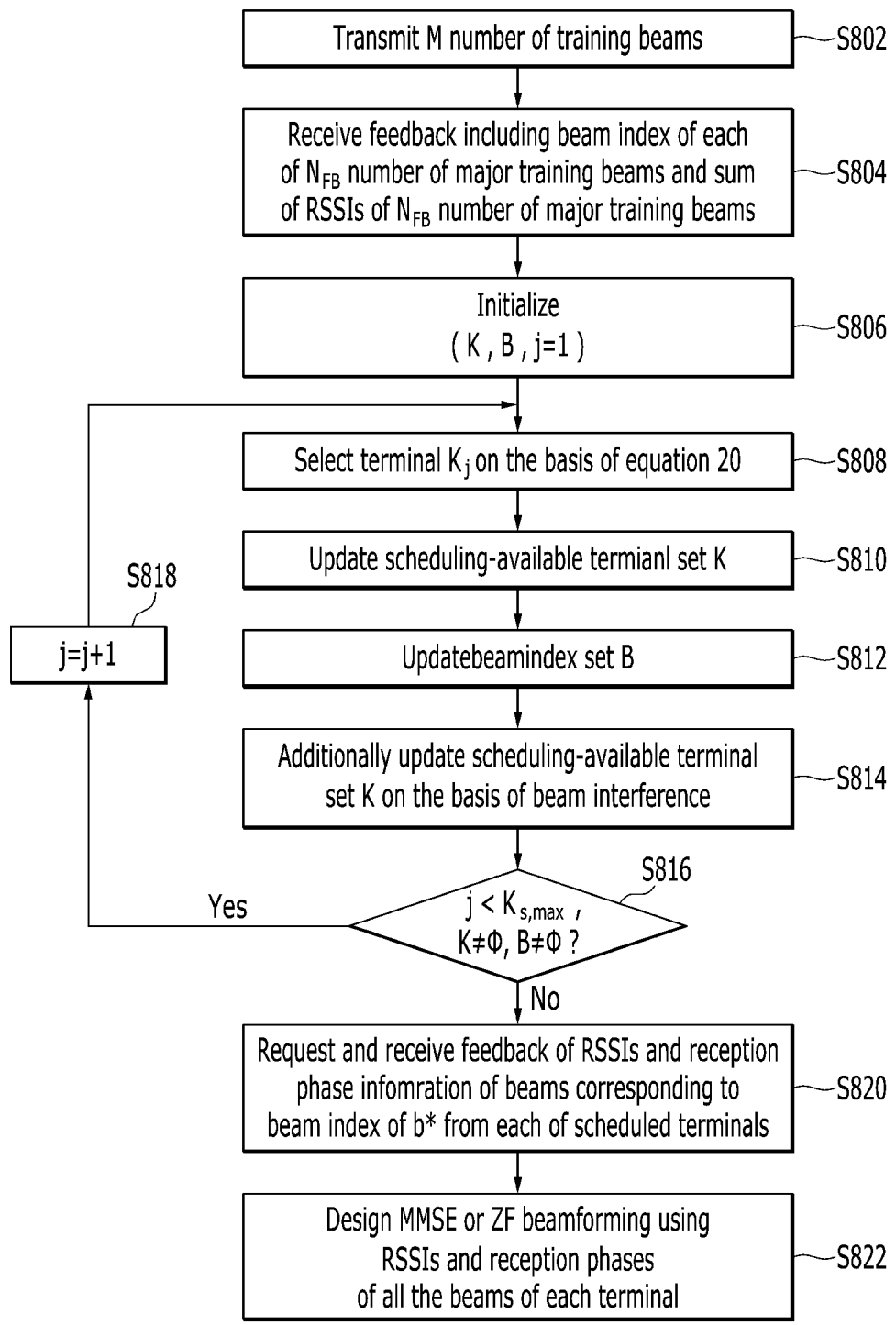
FIG. 8 is a flow chart illustrating feedback of a terminal based on two-section feedback and beamforming method of a base station according to a fourth exemplary embodiment of the present invention.

FIG. 8 is a flow chart illustrating feedback of a terminal based on two-section feedback and beamforming method of a base station according to a fourth exemplary embodiment of the present invention.

Referring to FIG. 8, the BS 100 transmits M number of training beams in operation S802.

The BS 100 receives feedback of only an index of each of $N_{FB}$ number of major training beams and the sum of RSSIs of the major training beams from each terminal in operation S804.

The BS 100 initializes a scheduling-available terminal set [$\mathcal{K}$ ={1, 2, . . . , K}], a beam index set of training beams [$\mathcal{B}$ ={1, 2, . . . , M}], and j in operation S806.

The BS 100 selects a terminal with highest RSSI when the major training beams are used among the scheduling-available terminal set using Equation 20 in operation S808. A terminal selected from jth iteration will be referred to as $k_j$.

$$\mathcal{K}_j = \underset{k \in \mathcal{K}}{\text{argmax}} \sum_{b \in \mathcal{B}_k} |h_k^H w_b|^2 \quad \text{(Equation 20)}$$

When the terminal $k_j$ is determined, the BS 100 updates a scheduling-available terminal set as expressed by Equation 21 in operation S810 and updates the beam index set as expressed by Equation 22 in operation S812. That is, the BS 100 excludes the terminal $k_j$ from the scheduling-available terminal set, and excludes the major training beam $\mathcal{B}_{\kappa_j}$ of the terminal $k_j$ from the beam index set B.

$$\mathcal{K} \leftarrow \mathcal{K} \setminus \{k_j\} \quad \text{(Equation 21)}$$

$$\mathcal{B} = \mathcal{B} \setminus \{\mathcal{B}_{\kappa_j}\} \quad \text{(Equation 22)}$$

The BS 100 updates the scheduling-available terminal set $\mathcal{K}$ according to Equation 23 such that only a terminal whose major training beam less overlaps the major training beam of the terminal $k_j$ is left in the scheduling-available terminal set $\mathcal{K}$ in operation S814.

$$\mathcal{K} = \{k \in \mathcal{K} : |\mathcal{B}_{\kappa_j} \cap \mathcal{B}_k| \leq N_{OL}\} \quad \text{(Equation 23)}$$

Here, $N_{OL}$ is a maximum allowable number of major training beams that overlap between mutually different terminals.

When the scheduling-available terminal set $\mathcal{K}$ is updated with terminals satisfying Equation 23, the BS 100 may leave only a terminal whose channel is substantially orthogonal to that of the currently selected terminal when simultaneously scheduled with the currently selected terminal, in the scheduling-available terminal set $\mathcal{K}$.

When the BS 100 satisfies all of $k<K_{s,max}$, $\mathcal{K} \neq \emptyset$, $\mathcal{B} \neq \emptyset$ in operation S816, the BS 100 increases to j=j+1 in operation S818 and repeatedly performs operations S808 to S816, or otherwise, the BS 100 terminates the terminal scheduling algorithm in operation. Here, $K_{s,max}(\leq M)$ is a predetermined constant value (natural number).

After scheduling the terminals, the BS 100 may define a beam set B* obtained by unionizing the major training beams of each of the scheduled terminals as expressed by Equation 24.

$$\mathcal{B}_{\kappa_j}* := \cup_{i=1}^{J} \mathcal{B}_{\kappa_j} \quad \text{(Equation 24)}$$

Here, J is a value j when moving from operation S816 to operation S820.

The BS 100 additionally requests feedback of RSSIs of beams corresponding to the beam index within $\mathcal{B}_{\kappa_j}*$ and reception phase information from each terminal, and receives feedback including RSSIs of beams corresponding to the beam index within $\mathcal{B}_{\kappa_j}*$ and reception phase information from corresponding terminals in operation S822.

Upon receiving the feedback from each terminal, the BS 100 knows the reception signals and reception phases of all the beams within $\mathcal{B}_{\kappa_j}*$ of each terminal, and thus, the BS 100 accurately comes to know a CSI of each terminal within a subspace spanned by the beams corresponding to the beam index within $\mathcal{B}_{\kappa_j}*$. The BS 100 designs MMSE or ZF beamforming on the basis of the CSI information within the subspace in operation S824. Furthermore, The BS 100 may design any beamforming that is different from the MMSE or ZF beamforming on the basis of the CSI information within the subspace.

It can be noted that an amount of feedback of the terminal when such scheduling method and beamforming is one real number and $N_{FB}$ number of integers in a feedback stage of a first interval, and $2|\mathcal{B}_{\kappa_j}*|$ real numbers in a feedback stage of a second interval.

The scheduling method described above may also be applied as is even to a structure in which hybrid analog/digital beamforming is considered in a situation that the number ($N_{RF}$) of RF chains in the BS 100 is smaller than the number (M) of antennas of the BS 100. In detail, in the hybrid analog digital beamforming situation, analog beam training is performed, and here, terminals are scheduled according to the aforementioned MRT and EGC type scheduling method and an analog beam to be used for transmitting data to a corresponding terminal may be generated. However, since the number of terminals to which data is to be simultaneously transmitted is limited to $N_{RF}$ number, $K_{s,max} \leq N_{RF}$.

Figure 9:
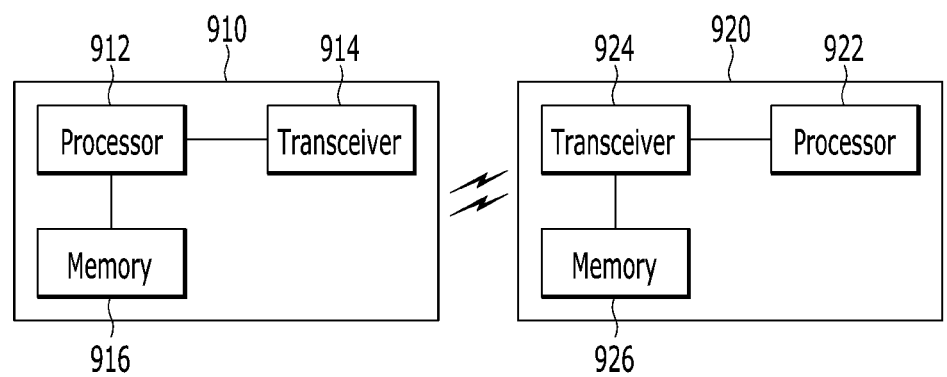
FIG. 9 is a view illustrating a base station and a terminal according to exemplary embodiment of the present invention.

FIG. 9 is a view illustrating a base station and a terminal according to exemplary embodiment of the present invention.

Referring to FIG. 9, a scheduling device 910 of a BS includes a processor 912, a transceiver 914, and a memory 916. The processor 912 may be configured to implement a function, an operation, a procedure, a method, and the like, for beamforming and scheduling in the BS described above in the exemplary embodiment of the present invention. The processor 912 may implement the function, the operation, the procedure, the method, and the like, for scheduling in the BS described above by executing instructions stored in or loaded from the memory 916. The transceiver (or a transmitter and receiver) 914 is connected to the processor 912 to transmit and/or receive a wireless signal. The transceiver 914 may include a plurality of antenna elements. The memory 916 is connected to the processor 912 to store various types of information for driving the processor 912. The memory 916 may store an instruction to be performed in the processor 912 or load an instruction from a storage device (not shown) and temporarily store the instruction.

A feedback device 920 of a terminal includes a processor 922, a transceiver 924, and a memory 926. The processor 922 may be configured to implement a function, an operation, a procedure, a method, and the like, for feedback from a terminal described above in the exemplary embodiment of the present invention. The processor 922 may execute instructions stored in or loaded from the memory 926 to implement the function, the operation, the procedure, the method, and the like, for feedback from a terminal described above. The transceiver 924 is connected to the processor 922 to transmit and/or receive a wireless signal. The memory 926 is connected to the processor 922 and stores various types of information for driving the processor 922. The memory 926 may store an instruction to be performed in the processor 922 or load an instruction from a storage device (not shown) and temporarily store the instruction.

The processors 912 and 922 may refer to a central processing unit (CPU), a graphics processing unit (GPU), or a dedicated processor performing the methods according to an exemplary embodiment of the present invention.

The memories 916 and 926 may include a read-only memory (ROM), a random access memory (RAM), a flash memory, a memory card, a storage medium and/or other storage device.

According to an exemplary embodiment of the present invention, an amount of feedback of a terminal may be reduced, and a terminal may be effectively scheduled even with the reduced amount of feedback, enhancing system performance.

The exemplary embodiments of the present disclosure may not necessarily be implemented only through the foregoing devices and/or methods but may also be implemented through a program for realizing functions corresponding to the configurations of the exemplary embodiments of the present invention, a recording medium including the program, or the like. Such an implementation may be easily conducted by a person skilled in the art to which the present invention pertains from the foregoing description of embodiments.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for scheduling a plurality of terminals within a cell by a base station (BS) using a plurality of beams, the method comprising:
   transmitting a plurality of training beams;
   receiving measurement information including a received signal strength indication (RSSI), a reception phase, and a beam index regarding each of a first number of training beams with a highest RSSI from each of the plurality of terminals which have received the plurality of training beams;
   generating an RSSI table representing RSSIs of terminals and beam indices on the basis of measurement information regarding the first number of training beams of each terminal; and
   scheduling terminals to perform simultaneous transmission among the plurality of terminals using the RSSI table, wherein:
   the scheduling includes:
   selecting a terminal whose sum of squares of RSSIs of a first number of training beams is largest from among terminals of a scheduling-available terminal set;
   excluding the selected terminal from the terminal set and excluding the first number of training beams of the selected terminal from a beam index set including the plurality of beams;
   excluding a terminal whose number of beams, among a first number of training beams, overlapping the first number of training beams of the selected terminal, is greater than a set maximum allowable number, among the terminals of the terminal set, from the terminal set; and
   scheduling the terminals to perform simultaneous transmission by repeating the selecting, the generating, and the excluding operations.

2. The method of claim 1, wherein:
   the scheduling further includes: generating a transmission beam to the selected terminal using the RSSI of the first number of training beams of the selected terminal.

3. The method of claim 1, further comprising:
   defining a beam set obtained by unionizing the first number of training beams of each of the scheduled terminals;
   allocating a value 0 to RSSIs and reception phases of beams whose feedback has not been received from each of the scheduled terminals, among beams of the unionized beam set; and
   designing minimum mean square error (MMSE) or zero-forcing (ZF) beamforming using RSSIs and reception phases of all the beams of each of the scheduled terminals.

4. A method for scheduling a plurality of terminals within a cell by a base station (BS) using a plurality of beams, the method comprising:
   transmitting a plurality of training beams;
   receiving measurement information including a beam index regarding each of a first number of training beams with a highest received signal strength indication (RSSI) from each of the plurality of terminals which have received the plurality of training beams, and the sum of RSSIs of the first number of training beams;
   generating an RSSI table representing RSSIs of terminals and beam indices on the basis of measurement information regarding the first number of training beams of each terminal; and
   scheduling terminals to perform simultaneous transmission among the plurality of terminals using the RSSI table, wherein:
   the scheduling includes:
   selecting a terminal whose sum of RSSIs of the first number of training beams is largest, from a scheduling-available terminal set;
   excluding the selected terminal from the terminal set and excluding the first number of training beams of the selected terminal from a beam index set including the plurality of beams;
   excluding a terminal whose number of beams, among the first number of training beams, overlapping the first number of training beams of the selected terminal, is greater than a set maximum allowable number, among the terminals of the terminal set, from the terminal set; and
   scheduling terminals to perform simultaneous transmission by repeating the selecting, the generating, and the excluding operations.

5. The method of claim 4, further comprising:
   generating a transmission beam to be transmitted to the selected terminal using reception phases of the first number of training beams of the selected terminal,
   wherein the measurement information further includes a reception phase regarding each of the first number of training beams.

6. The method of claim 4, further comprising:
   defining a beam set obtained by unionizing the first number of training beams of each of the scheduled terminals;
   requesting feedback from each of the scheduled terminals for receiving RSSIs and reception phases of beams of the unionized beam set from each of the terminals; and
   designing MMSE or ZF beamforming using the RSSIs and the reception phases of the beams of the unionized beam set of each of the scheduled terminals.

7. An apparatus for scheduling a plurality of terminals within a cell by a base station (BS) using a plurality of beams, the apparatus comprising:
   a transceiver transmitting a plurality of training beams, and receiving measurement information regarding a first number of training beams with a highest received signal strength indication (RSSI) from each of the plurality of terminals which have received the plurality of training beams; and
   a processor generating an RSSI table representing RSSIs of terminals and beam indices on the basis of the measurement information regarding the first number of training beams of each terminal, and scheduling the plurality of terminals using the RSSI table according to a beamforming scheme of the BS, wherein:
   the processor schedules a set number of terminals on the basis of a sum of squares of RSSIs of the first number of training beams of each of terminals of a scheduling-available terminal set or a sum of RSSIs of the first number of training beams, and excludes a terminal whose number of beams, among a first number of training beams, overlapping a first number of training beams of the scheduled terminals, is greater than a set maximum allowable number, among the terminals of the terminal set, from the scheduling.

8. The apparatus of claim 7, wherein:

the processor generates transmission beams for a maximum ratio transmission (MRT) type beamforming by combining RSSIs regarding the first number of training beams of each of the scheduled terminals.

9. The apparatus of claim 7, wherein:

the processor allocates a value 0 to RSSIs and reception phases of beams whose feedback has not been received from each of the scheduled terminals, among beams of a beam set obtained by unionizing the first number of training beams of each of the scheduled terminals, and subsequently designs minimum mean square error (MMSE) or zero-forcing (ZF) beamforming or any beamforming using RSSIs and reception phases of all the beams of each of the scheduled terminals.

10. The apparatus of claim 7, wherein:

the processor schedules a set number of terminals on the basis of the sum of RSSIs of the first number of training beams of each of terminals of a scheduling-available terminal set, generates a transmission beam for an equal gain combining (EGC) type beamforming by combining reception phases regarding the first number of training beams of each of the scheduled terminals.

11. The apparatus of claim 7, wherein:

the processor schedules a set number of terminals on the basis of the sum of RSSIs of the first number of training beams of each of terminals of a scheduling-available terminal set, requests RSSIs and reception phases of beams of a beam set obtained by unionizing the first number of training beams of each of the scheduled terminals from each of the scheduled terminals, receives the requested RSSIs and reception phases from each of the scheduled terminals, and designs minimum mean square error (MMSE) or zero-forcing (ZF) beamforming or any beamforming using the RSSIs and the reception phases of the beams of the unionized beam set received from each of the scheduled terminals.

* * * * *